US005260114A

United States Patent [19]

Smith, Jr.

[11] Patent Number: 5,260,114

[45] Date of Patent: Nov. 9, 1993

[54] THERMAL TRANSFER PRINTING OF WINDOW GRILLES

[75] Inventor: Bernard F. Smith, Jr., Haggerstown, Md.

[73] Assignee: Caldwell Manufacturing Company, Rochester, N.Y.

[21] Appl. No.: 684,588

[22] Filed: Apr. 12, 1991

[51] Int. Cl.[5] .......................... B32B 3/00; B44C 1/165

[52] U.S. Cl. .................................... 428/161; 428/156; 428/33; 428/172; 428/164; 428/200; 428/207; 428/209; 428/542.2; 156/234; 156/235; 156/237; 156/239; 156/241; 156/277; 156/385; 156/387; 156/388

[58] Field of Search ............... 428/156, 172, 209, 192, 428/169, 120, 33, 161, 164, 200, 207, 143, 542.2; 156/234, 235, 237, 239, 241, 277, 385, 387, 388

[56] References Cited

U.S. PATENT DOCUMENTS

| | | | |
|---|---|---|---|
| 3,648,604 | 3/1972 | Warsager | 101/181 |
| 3,666,610 | 5/1972 | Rosen | 161/113 |
| 4,118,264 | 10/1978 | Boettcher | 156/238 |
| 4,288,275 | 9/1981 | Davis | 156/367 |
| 4,350,550 | 9/1982 | Van Manen | 156/237 |
| 4,542,691 | 9/1985 | Kokrhanek | 101/114 |
| 4,862,827 | 9/1989 | Getson | 118/620 |
| 4,902,364 | 2/1990 | Parker et al. | 156/233 |
| 4,914,079 | 4/1990 | Takei et al. | 503/227 |

*Primary Examiner*—Donald J. Loney
*Attorney, Agent, or Firm*—Eugene Stephens & Associates

[57] ABSTRACT

Grille sticks used in the assembly of conventional window grilles are prefinished during their manufacture by a conventional foil transfer printing technique. Preferably, only one side surface of the grille sticks intended to face a window glazing is prefinished. The dry printing technique enables the finish material to cover the desired surface of the grille stick without entering joints where the sticks are assembled together or spreading on the opposite side surface of the sticks, which is left to be finished in a contrasting color.

14 Claims, 2 Drawing Sheets

THERMAL TRANSFER PRINTING OF WINDOW GRILLES

BACKGROUND

Window grilles are mounted on inside surfaces of window panes to have the effect of dividing the panes into groups of smaller panes or "lights". The grilles give an appearance of a traditional pattern of small panes, a look that continues to be popular in new homes.

Generally, the grilles are manufactured and shipped to builders in the form of precut sticks with half-lap joints for assembling the sticks together in a desired pattern. The builders assemble and sometimes finish the grilles before installing them in windows. Although most of the finishing work on the grilles is done by either builders or home owners, some grille sticks are shipped to builders in a prefinished condition.

However, prefinishing of the grille sticks can add considerable cost to their manufacture because extra care must be taken to prevent paints or other finishes from entering the half-lapped joints. Masking of the joints to protect them from the finishes can be very time consuming and difficult to accomplish with consistent results. Also, any finishes applied to the grille sticks are generally applied to all sides of the sticks because it would be prohibitively expensive to mask whole sides of the sticks.

Nevertheless, home owners often prefer different finishes on the opposite sides of window grilles. For example, paint is often preferred on the side of the grille visible from the exterior of the home, whereas a stain or clear varnish is preferred on the interior side of the same grille, or two different colors of paint are preferred on the opposite sides of the grille.

Since it has not been practical for the manufacturers of grille sticks to provide the two different finishes on opposite sides of window grilles, the task of applying the desired finishes has been left to builders or home owners, neither of which are particularly well equipped to do a good job without expending a considerable amount of time. Of course, professional painters can do the job, but this adds considerable incremental cost to the grilles, which are otherwise a rather inexpensive window treatment.

SUMMARY OF THE INVENTION

My invention combines heretofore unrelated technologies, namely, the manufacture of window grille components and the art of thermal transfer printing to enable the manufacturers of grille sticks to prefinish selected portions of the sticks. For the first time, it will now be practical for manufacturers to ship to builders grille sticks that are at least partially finished during manufacture. The prefinishing of grille sticks by manufacturers is expected to significantly reduce the cost of window grilles to builders and home owners who would otherwise be responsible for finishing the grilles.

The prefinishing of grille sticks is accomplished by applying a well-known dry printing technique to selected surfaces of the grille sticks. The technique involves transferring a combination of printing and adhesive materials from a carrier web, or "foil", to the selected surface of a grille stick under the influence of elevated temperatures and pressures applied between the carrier web and grille stick. In the past, this known dry printing technique, also referred to as "foil transfer printing", has been used to apply ink and other printing media to a variety of product surfaces such as those of appliances, interior automotive trim, and furniture. However, no one has until now appreciated the remarkable benefits of applying foil transfer printing techniques to the manufacture of grille sticks.

The combination of technologies relating to manufacture of grille sticks and dry printing techniques has resulted in a new grille stick that has heretofore not been available from grille stick manufacturers. In addition to the usual features of such sticks, the grille stick of the present invention includes at least one of its side surfaces prefinished by foil transfer printing. Preferably, the prefinished surface is on one side of the stick that is intended to be visible from the exterior of a home. It is of great benefit to have this surface of grille sticks prepainted to a decorative color, such as white. The remainder of the stick could remain unfinished so that the home owner can stain or paint the inside surface of the grille to match other interior decoration or trim. However, it would also be possible to apply a second contrasting color to the interior side of the grille, matching common colors and stains used by home owners.

A new method contemplated by the present invention involves prefinishing selected surfaces of the grille sticks in a foil transfer printing operation that is adapted for printing on grille sticks. A web carrying a combination of printing and adhesive materials is arranged between a source of heat and pressure and the grille stick. The heat and pressure are applied between the web and grille stick for transferring the printing and adhesive materials to selected surfaces of the grille stick. However, the application of heat and pressure is limited to predetermined areas of the grille stick to prevent the printing and adhesive materials from entering joints that are formed in the sticks for putting them together in a predetermined pattern. The ability to keep the finishing materials out of the joints enables the grille sticks to be prefinished by a manufacturer without inhibiting their later assembly or requiring expensive masking procedures to keep the finishing materials out of the joints and away from other surfaces of the sticks.

DETAILED DESCRIPTION

Figure 1:
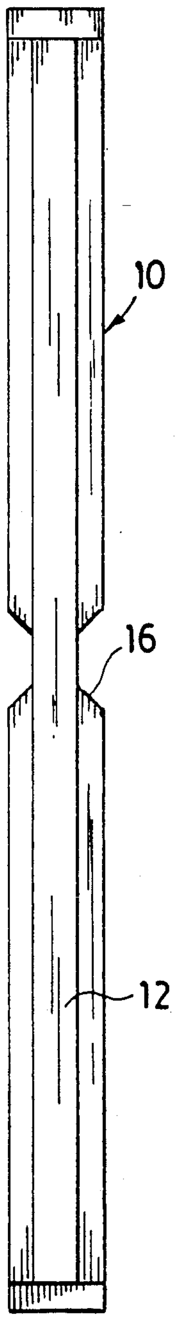
FIG. 1 is a front view of a conventional grille stick used in the assembly of a window grille.
Figure 2:
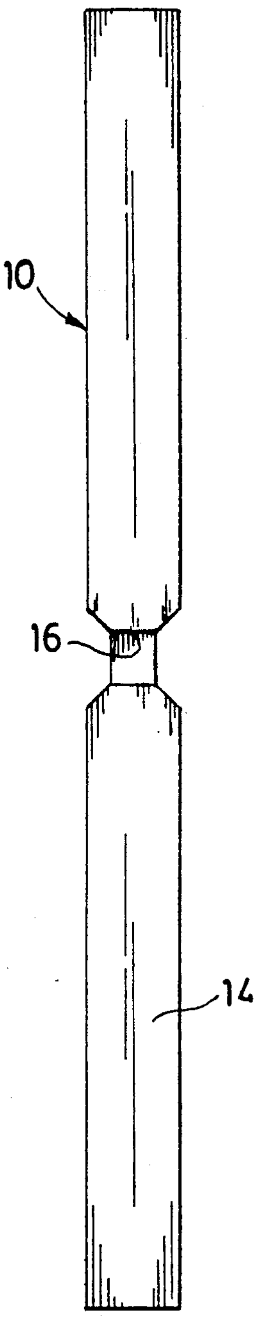
FIG. 2 is a view of the back of the same grille stick.

A conventional grille stick of the type treated by my invention is shown in FIGS. 1 and 2. The stick 10 is made of wood and has been worked to include a contoured front surface 12 and a flat back surface 14. Interrupting both surfaces 12 and 14 is a half-lap joint 16 that is intended to cooperate with a complementary half-lap joint on another grille stick to form a grille assembly.

Figure 3:
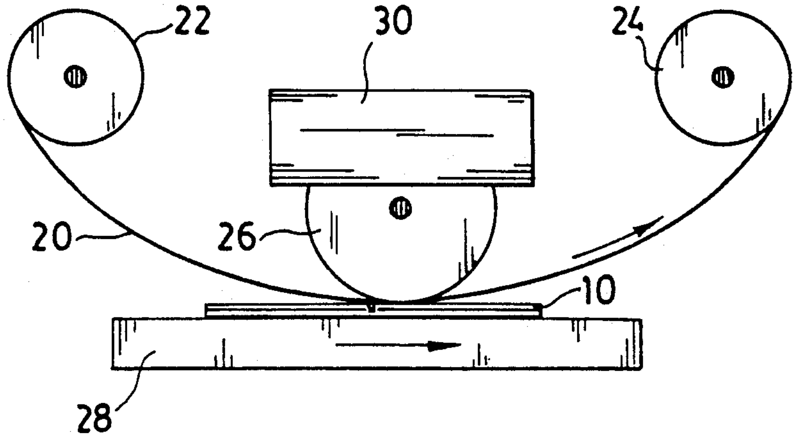
FIG. 3 is a schematic depiction of conventional foil transfer printing apparatus.
Figure 4:
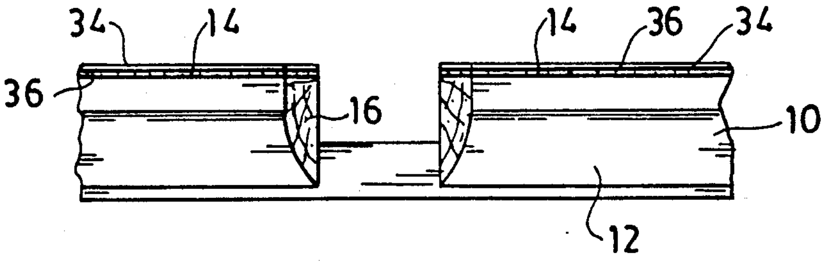
FIG. 4 is a side view of a portion of the grille stick shown in FIGS. 1 and 2 with a decorative coating applied to the back surface of the stick.

FIG. 3 schematically depicts a foil transfer printing station for finishing either of the front and back surfaces 12 and 14 of grille stick 10. A carrier web 20 is threaded through the printing station between unwind roll 22 and windup roll 24. In accordance with known foil transfer printing practices, the web includes a base layer of film such as polyester on which a release layer, a print layer, and an adhesive layer are applied. The print layer may include a wide variety of materials, including inks, paint pigments, and binders to comprise the desired finish on the grille stick.

The web 20 is threaded between a silicone rubber roller 26 and the grille stick i?, which is fastened down on a translatable work table 28. A heating shroud 30 covers part of the roller 26 to elevate the surface temperature of the roller.

According to conventional practices, the grille stick 10 is translated on the table 28 into a position that brings the carrier web 20 into contact with both the roller and the grille stick. The roller is biased toward the table 28 so that a predetermined amount of pressure is exerted on the web against the grille stick. When contact is made between the roller, web, and grille stick, a clutch (not shown) through which the roller is driven is disengaged, allowing the roller to turn at a slightly faster rate corresponding to the surface speed of the translating grille stick.

Heat conducted from the roller 26 through the web 20 melts the release layer, thereby separating the printing and adhesive layers from the base layer of film. Pressure applied by the roller against the grille stick helps to bond the adhesive together with the printing material to the surface of the grille stick.

Characteristic of foil transfer printing processes, the printing and adhesive layers bond only to such surfaces that come under pressure from the roller 26. For example, a printing layer 34 and an adhesive layer 36 are bonded to the back surface 14 of grille stick 10 without any of these materials entering the half-lap joint 16. The printing and adhesive materials are also bonded along the perimeter of the bottom surface 14 without spreading any of these materials on the contoured front surface 12 of the stick.

The finished back surface 14 of the grille stick 10 is intended to face a window glazing when assembled and installed as part of a window grille assembly. The print material preferably includes a pigment together with an appropriate binder for forming a painted finish. The color of the pigment is preferably selected to match a desired exterior trim color preferred by a home owner or builder. The opposite side surface 12 preferably remains unfinished at its time of manufacture to permit the contoured surface to be stained or painted as desired by a home owner or builder after the grille has been assembled. Although the finishing of the inside surface of the grille is preferably left to the home owner or builder, the task of finishing this surface is made much easier because stains and finishes that a home owner or builder might apply to the inside surface of a grille can be easily wiped off from the printed outer surface. This makes the grilles much easier for the home owner to finish in a professional manner.

However, it would also be possible to apply the foil printing technique to both the inside and outside surfaces of a grille stick for the purpose of providing a prefinished grille stick in contrasting colors. According to known practices, the roller 26 would be given a contour shape matching that of the contoured inner surface 12. This would enable the requisite heat and pressure to be applied to the contoured surface for releasing and bonding the desired printing and adhesive material.

I claim:

1. An article of manufacture for window grilles comprising:

a stick having a joint for assembly with other sticks to form a window grille;

one side of said stick having a first surface formed for facing against a window glazing;

another side of said stick having a second contoured surface for facing an interior space of a room;

a first layer consisting essentially of adhesive material being applied to one of said first and second surfaces;

a second layer consisting essentially of printing material being applied to said first layer of adhesive material; and said first and second layers of adhesive and printing materials forming distinct layers on said one of the first and second surfaces.

2. The article of claim 1 in which said first and second layers of adhesive and printing materials form distinct layers on said first surface.

3. The article of claim 2 in which said printing material includes a pigment for coloring said finished surface.

4. The article of claim 3 in which a third layer consisting essentially of adhesive material is applied to said second surface, a fourth layer consisting essentially of printing material is applied to said third layer of adhesive material, and said third and fourth layers of adhesive and printing materials form distinct layers on said second surface.

5. The article of claim 4 in which said printing material of said fourth layer is different from said printing material of said second layer.

6. The article of claim 1 in which said said first and second layers of adhesive and printing materials form distinct layers on said first surface without any of said materials entering said joint and without spreading any of said materials on said second surface.

7. The article of claim 6 in which said second surface remains unfinished during manufacture.

8. A method of prefinishing grille sticks of a window grille assembly comprising the steps of:

arranging a web carrying distinct layers of printing and adhesive materials between a source of heat and pressure and a grille stick;

applying heat and pressure between said web and said grille stick for transferring said layers of printing and adhesive materials to a surface of said grille stick in a form that preserves the distinction between said layers of printing and adhesive materials; and limiting application of heat and pressure to predetermined areas of said grille stick to prevent said printing and adhesive materials from entering one or more joints formed in said surface of the stick.

9. The method of claim 8 in which said step of applying heat and pressure includes transferring said layers of printing and adhesive materials to a surface that is on a side of the stick intended for facing against a window glazing in an assembled grille.

10. The method of claim 9 in which said printing material includes a pigment for coloring said glazing side surface of the stick.

11. The method of claim 10 in which said step of limiting application of heat and pressure also provides for preventing said printing and adhesive materials from being applied to another surface that is on an opposite side of the stick intended for facing into a room in the assembled grille.

12. The method of claim 10 in which said step of applying heat and pressure includes transferring different layers of printing and adhesive materials to another surface that is on an opposite side of the stick intended for facing into a room in the assembled grille.

13. A grille stick manufactured according to the method of claim 10 having a relatively flat surface intended for facing the window glazing and a contoured surface intended for facing a room in the assembled grille.

14. A grille stick manufactured according to the method of claim 12 in which the different layers of printing and adhesive materials include a contrasting color of pigment.

* * * * *